United States Patent
Jacobsen et al.

(10) Patent No.: US 7,442,750 B2
(45) Date of Patent: *Oct. 28, 2008

(54) SUPPORTED OLEFIN POLYMERIZATION CATALYST

(75) Inventors: Grant Berent Jacobsen, Bouc-Bel-Air (FR); Brian Stephen Kimberley, Bouche du Rhone (FR); Claudine Viviane Lalanne-Magne, Saint Mitre les Remparts (FR); Sergio Mastroianni, Martigues (FR)

(73) Assignee: Innovene Europe Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/539,557

(22) PCT Filed: Dec. 3, 2003

(86) PCT No.: PCT/GB03/05207

§ 371 (c)(1), (2), (4) Date: Jun. 17, 2005

(87) PCT Pub. No.: WO2004/055062

PCT Pub. Date: Jul. 1, 2004

(65) Prior Publication Data

US 2006/0100402 A1    May 11, 2006

(30) Foreign Application Priority Data

Dec. 17, 2002   (EP) .................................. 02358030

(51) Int. Cl.
*C08F 4/613* (2006.01)
*C08F 4/64* (2006.01)
*C08F 4/643* (2006.01)
*C08F 4/6592* (2006.01)

(52) U.S. Cl. .................... 526/115; 526/113; 526/114; 526/118; 526/119; 526/127; 526/129; 526/134; 526/160; 526/161; 526/172; 502/152; 502/154; 502/155; 502/162; 502/167

(58) Field of Classification Search ................ 502/152, 502/154, 155, 162, 167; 526/113, 114, 115, 526/118, 119, 127, 129, 134, 160, 161, 172
See application file for complete search history.

(56) References Cited

U.S. PATENT DOCUMENTS

| | | | |
|---|---|---|---|
| 6,107,230 A * | 8/2000 | McDaniel et al. | 502/104 |
| 6,387,839 B1 | 5/2002 | Jin et al. | |
| 7,273,912 B2 * | 9/2007 | Jacobsen et al. | 526/169 |
| 2002/0119890 A1 * | 8/2002 | Wenzel et al. | 502/439 |
| 2003/0225225 A1 * | 12/2003 | Shih | 526/127 |

FOREIGN PATENT DOCUMENTS

| | | | |
|---|---|---|---|
| EP | 0 785 220 A1 | | 7/1997 |
| EP | 1 097 949 A1 | | 5/2001 |
| WO | WO 99/02570 | * | 1/1999 |
| WO | WO 02/44222 A1 | | 6/2002 |

* cited by examiner

*Primary Examiner*—Roberto Rábago
(74) *Attorney, Agent, or Firm*—Finnegan, Henderson, Farabow, Garrett and Dunner, L.L.P.

(57) ABSTRACT

Supported catalyst systems are provided comprising (a) a transition metal compound, (b) an activator comprising (iii) an aluminoxane or (iv) a Group lilA metal or metalloid compound, and (c) a support material comprising an inorganic metal oxide, inorganic metal halide or polymeric material or mixtures thereof characterised in that the support material has been pretreated with a source of a transition metal atom. The preferred transition metal compounds are metallocenes and the source of the transition metal atom is typically a ferrous or cupric metal salt. The supported catalyst systems show improved activity and also may reduce fouling in gas phase fluidised bed processes.

34 Claims, No Drawings

SUPPORTED OLEFIN POLYMERIZATION CATALYST

BACKGROUND OF THE INVENTION

The present invention relates to supported catalysts and in particular to supported catalysts for use in the gas phase (co-) polymerisation of olefins in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidised the bed, and to maintain the bed at the desired temperature. Monomers consumed by the polymerisation reaction are normally replaced by adding make up gas or liquid to the polymerisation zone or reaction loop.

It is also well known that fouling in gas phase polymerisation process can be a major problem, and can be caused by non-uniform fluidisation as well as poor heat transfer in the polymerisation process. Catalyst and polymer particles may adhere together or to the walls of the reactor and continue to polymerised, and often fuse together and form chunks, which can be detrimental to a continuous process, particularly a fluidised bed process The incorporation of antistatic agents in polymerisation catalysts is well known. For example U.S. Pat. No. 5,414,064 describes the use of Stadis with chromium based catalysts while U.S. Pat. No. 5,498,581 describes again the use of Stadis with silica supported metallocene catalyst systems.

U.S. Pat. No. 6,469,111 describes the gas phase polymerisation of olefins using a catalyst system containing an antistatic agent based on magnesium oxide or zinc oxide. The oxides are used in a mixture with a supported polymerisation catalyst component. The catalyst systems described therein include supported chromium oxide catalysts and also supported metallocene complexes in particular bis(cyclopentadienyl) metallocene complexes.

More recently WO 02/066524 describes supported catalysts for olefin polymerisation comprising a combination of a sulfated metal oxide support and an aluminoxane. The sulphated metal oxide support may be easily prepared by contacting a precursor metal oxide with a material having a $SO_4$ group such as sulphuric acid or ammonium sulphate. Typically the resultant aluminoxane deposited on the sulphated metal oxide is used with an organometallic complex of a Group 4 metal, in particular with metallocene complexes comprising both a cyclopentadienyl ligand and a phosphinimine ligand.

U.S. Pat. No. 6,107,230 describes catalyst compositions comprising inorganic metal oxides impregnated with metal salts eg. cupric sulfate, metallocenes and organoaluminium compounds. The compositions may be combined together or preferably added separately into the reactor. An important aspect of this disclosure is that traditional activators such as aluminoxanes, borates or magnesium chloride are not required.

SUMMARY OF THE INVENTION

We have now found that the incorporation of a transition metal atom into the support material of a supported polymerisation catalyst system may have beneficial effects for activity as well as resulting in decreased static levels on the resultant polymers.

Thus according to the present invention there is provided a supported catalyst system suitable for the polymerisation of olefins comprising
 (a) a transition metal compound,
 (b) an activator comprising
  (i) an aluminoxane or
  (ii) a Group IIIA (CAS Version) metal or metalloid compound, and
 (c) a support material comprising an inorganic metal oxide, inorganic metal halide or polymeric material or mixtures thereof characterised in that the support material has been pretreated with a source of a transition metal atom.

DETAILED DESCRIPTION OF THE INVENTION

The source of the transition metal atom is preferably an organic or an inorganic metal compound and is preferably a metal salt.

The preferred transition metal salts are for example metal salts of iron, copper, cobalt, nickel and zinc. The preferred metal salts are those of iron and copper.

The preferred salts are sulphates, nitrates, phosphates or acetates. The most preferred salts are sulphates.

Also suitable are acid salts such as gluconates for example ferrous D-gluconate dihydrate.

Particularly preferred salts for use in the present invention are ferrous sulphate ($FeSO_4$) and cupric sulphate ($CuSO_4$).

The most preferred support material for use with the catalyst system according the present invention are inorganic metal oxides in particular oxides of aluminium, silicon, zirconium, zinc and titanium. Alumina, silica and silica-alumina are preferred metal oxides. Suitable silicas include Crosfield ES70, Davison 948 and Sylopol 948 silicas.

The support material is preferably treated with a water solution of the required transition metal salt.

The support material may then be further subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

The support material is pretreated with the organometallic compound at a temperature of –20° C. to 150° C. and preferably at 20° C. to 100° C.

Other suitable support materials include Group IIa metal halides for example magnesium chloride or polymeric materials such as finely divided polyolefins for example finely divided polyethylene.

The transition metal content on the support material is typically in the range 0.001% to 10%.

Suitable transition metal compounds for use in the catalyst system of the present invention are those based on the late transition metals (LTM) of Group VIII for example compounds containing iron, nickel, manganese, ruthenium, cobalt or palladium metals.

Examples of such compounds are described in WO 98/27124 and WO 99/12981 and may be illustrated by [2,6-diacetylpyridinebis(2,6-diisopropylanil)FeCl$_2$], 2.6-diacetylpyridinebis (2,4,6-trimethylanil) FeCl$_2$ and [2,6-diacetylpyridinebis(2,6-diisopropylanil)CoCl$_2$].

Other transition metal compounds include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized α-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred transition metal compound is a bulky ligand compound also referred to as a metallocene complex containing at least one of the aforementioned delocalized π-bonded group, in particular cyclopentadienyl ligands. Such metallocene complexes are those based on Group IVB (CAS Version) metals for example titanium, zirconium and hafnium.

Metallocene complexes may be represented by the general formula:

L$_x$MQ$_n$ where L is a cyclopentadienyl ligand, M is a Group IVB metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2.3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group IVB (CAS Version) metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

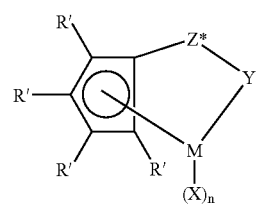

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system., and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine]dichloride.

Another type of transition metal compound suitable for use in the present invention are monocyclopentadienyl complexes comprising heteroallyl moieties such as zirconium (cyclopentadienyl) tris (diethylcarbamates) as described in U.S. Pat. No. 5,527,752 and WO 99/61486.

Particularly preferred metallocene complexes for use in the catalyst system of the present invention may be represented by the general formula:

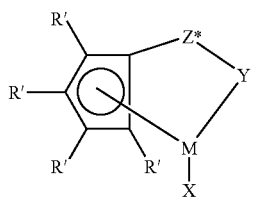

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes suitable for use in the catalyst system of the present invention are those disclosed in WO 95/00526 and are incorporated herein by reference.

A particularly preferred complex for use in the present invention is (t-butylamido) (tetramethyl-$\eta^5$-cyclopentadienyl) dimethyl silanetitanium-$\eta^4$-1.3-pentadiene.

Suitable activators for use in the present invention are aluminoxanes or Group IIIA metal or metalloid compounds.

Aluminoxanes are well known as activators for metallocene complexes. Suitable aluminoxanes, for use in the catalyst system of the present invention, include polymeric or oligomeric aluminoxanes in particular methyl aluminoxane (MAO).

Preferred Group IIIA metal or metalloid compounds are those wherein the metal is boron.

Particularly preferred Group IIIA metal or metalloid compounds are fluorine containing Group IIIA metal or metalloid compounds.

Suitable boron compounds are triarylboron compounds, in particular perfluorinated triarylboron compounds.

A particularly preferred triarylboron compound is tris(pentafluorophenyl) borane (FAB).

Preferred Group IIIA metal or metalloid compounds suitable as activators for use in the present invention are ionic compounds comprising a cation and an anion.

The cation is typically a Bronsted acid capable of donating a proton and the anion is typically a compatible non-coordinating bulky species capable of stabilizing the cation.

Such activators may be represented by the formula:

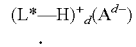

wherein

L* is a neutral Lewis base (L*—H)$^+_d$ is a Bronsted acid

A$^{d-}$ is a non-coordinating compatible anion of a Group IIIA metal or metalloid having a charge of d$^-$, and d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic activators used as activators are those wherein the cation of the ionic activator comprises a hydrocarbyl substituted ammonium salt and the anion comprises an aryl substituted borate.

Typical borates suitable as ionic activators include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorphenyl) borate.

Particularly suitable activators of this type are those ionic activators comprising a cation and an anion wherein the anion has at least one substituent comprising a moiety having an active hydrogen, Suitable activators of this type are described in WO 98/27119 the relevant portions of which are incorporated herein by reference.

Examples of this type of anion include:
triphenyl(hydroxyphenyl)borate
tri (p-tolyl)(hydroxyphenyl)borate
tris (pentafluorophenyl)(hydroxyphenyl)borate
tris (pentafluorophenyl)(4-hydroxyphenyl)borate Examples of suitable cations for this type of activator include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl) methylammonium and similar.

Particular preferred activators of this type are alkylammonium tris(pentafluorophenyl) 4-(hydroxyphenyl) borates. A particularly preferred activator is bis(hydrogenated tallow alkyl) methyl ammonium tris (pentafluorophenyl) (4-hydroxyphenyl) borate.

The preferred method of preparation of the supported catalyst systems of the present invention comprises
(a) treatment of the suppport material with a source of a transition metal atom
(b) addition of an activator, and
(c) addition of a transition metal compound.

The present invention is also suitable for use with traditional Ziegler Natta polymerisation catalyst systems wherein the support material is typically an inorganic metal halide for example magnesium chloride or an inorganic metal oxide for example silica.

Thus according to another aspect of the present invention there is provided a supported catalyst system for the polymerisation of olefins comprising (a) a transition metal compound,
(b) a cocatalyst comprising an organometallic compound, and
(c) a support material comprising an inorganic metal oxide, inorganic metal halide or polymeric material or mixtures thereof characterised in that the support material has been pretreated with a source of a transition metal atom.

Suitable transition metal compounds include those from Groups IVB-VIB (CAS Version), in particular compounds based on titanium compounds of formula MRx where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar.

Traditional Ziegler Natta catalysts are described in more detail in "Ziegler-Natta Catalysts and Polymerisation" by J. Boor, Academic Press, New York, 1979.

Vanadium based catalysts include vanadyl halides eg. $VCl_4$, and alkoxy halides and alkoxides such as $VOCl_3$, $VOCl_2(OBu)$, $VCl_3(OBu)$ and similar.

Other conventional transition metal compounds are those based on magnesium/titanium electron donor complexes described for example in U.S. Pat. No. 4,302,565.

Particularly suitable transition metal compounds are those described in WO 9905187 and EP 595574.

Suitable organometallic compounds suitable as cocatalysts are organoaluminium compounds for example trialkylaluminium compounds.

A preferred trialkylaluminium compound is triethylaluminum.

The supported catalyst systems of the present invention may comprise systems wherein all the components are present on the support material or alternatively may comprise systems wherein one or more of the components may be introduced separately into the polymerisation reactor.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in the presence of a supported catalyst system as hereinbefore described.

The supported systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system as hereinbefore described.

The preferred α-olefins are 1-butene, 1-hexene, 4-methyl-1-pentene and 1-octene.

The supported catalyst systems of the present invention may also be suitable for the preparation of other polymers for example polypropylene, polystyrene, etc.

When used for the polymerisation of olefins in a gas phase process the supported catalyst systems of the present invention may reduce static levels on the resultant polymers thereby preventing the formation of deposits on the reactor walls and reducing fouling in the reactor. This is particularly the case for processes performed in a fluidised bed reactor and in particular for the copolymerisation of ethylene and alpha-olefins.

Thus according to another aspect of the present invention there is provided a method for reducing the static charge on polymers prepared by a gas phase polymerisation of olefins in a fluidised bed reactor wherein said polymerisation is carried out in the presence of a supported catalyst system as hereinbefore described.

The present invention will now be further illustrated by reference to the following examples:

Abbreviations

| TEA | triethylaluminium |
|---|---|
| TiBAl | triisobutylaluminium |
| Ionic Activator A | $[N(H)Me(C_{18}H_{37})_2][B(C_6F_5)_3(p-OHC_6H_4)]$ |
| Complex A | $(C_5Me_4SiMe_2N^tBu)Ti(\eta^4-1,3-pentadiene)$ |

EXAMPLE 1

Preparation of Fe Sulfate Modified Silicas

To 20 g of silica Sylopol 948 was added the desired quantity (see table below) of FeSO4 as water solutions (1% wt in Fe for silicas 1 and 2 and 4.03% wt Fe for silica 3). The silica was the calcined under nitrogen at 250° C. for 5 h.

| Silica batch | Volume of FeSO4 solution added | [Fe] targeted (wt %) | [Fe] measured (wt %) |
|---|---|---|---|
| 1 | 2 ml | 0.1 | 0.1 |
| 2 | 10 ml | 0.5 | 0.47 |

-continued

| Silica batch | Volume of FeSO4 solution added | [Fe] targeted (wt %) | [Fe] measured (wt %) |
|---|---|---|---|
| 3 | 5 ml | 1 | 0.88 |
| 4 (ref) | 0 | 0 | 0 |

Catalyst Preparations

EXAMPLE 2

To a suspension of 5.293 g of silica 2 (as described above) in hexane (30 ml) was added 10 ml of TEA (solution in hexane, [Al]=1.027 mol/l). The mixture was allowed to react for 30 minutes then the liquid fraction was filtered and the remaining solid was washed with 3×20 ml of hexane and finally dried under vacuum.

[Al]=1.48 mmol/g

To 1.485 ml of a toluene solution (11.1 wt %) of Ionic activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated untif non lumps were visible and was allowed to stand for 30 min 10.42 ml of hexane were then added then the liquid fraction was filtered and the remaining solid was washed with 3×20 ml of hexane and finally dried under vacuum.

[Al]=1.41 mmol/g
[Ti]=31 µmol/g
[Fe]=0.084 mmol/g

EXAMPLE 3

To a suspension of 6.253 g of silica 1 (as described above) in hexane (30 ml) was added 10 ml of TEA (solution in hexane, [Al]=1.027 mol/l). The mixture was allowed to react for 30 minutes then the liquid fraction was filtered and the remaining solid was washed with 3×20 ml of hexane and finally dried under vacuum.

[Al]=1.46 mmol/g

To 1.485 ml of a toluene solution (11.1 wt %) of Ionic activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.37 mmol/g
[Ti]=31 µmol/g
[Fe]=0.017 mmol/g

EXAMPLE 4

To a suspension of 5.737 g of silica 3 (as described above) in hexane (30 ml) was added 10 ml of TEA (solution in hexane, [Al]=1.027 mol/l). The mixture was allowed to react for 30 minutes then the liquid fraction was filtered and the remaining solid was washed with 3×20 ml of hexane and finally dried under vacuum.

[Al]=1.40 mmol/g

To 1.485 ml of a toluene solution (11.1 wt %) of Ionic activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.35 mmol/g
[Ti]=31 μmol/g
[Fe]=0.15 mol/g

EXAMPLE 5 (COMPARATIVE)

To a suspension of 5.375 g of silica 4 (as described above) in hexane (30 ml) was added 10 ml of TEA (solution in hexane, [Al]=1.076 mol/l). The mixture was allowed to react for 30 minutes then the liquid fraction was filtered and the remaining solid was washed with 3×20 ml of hexane and finally dried under vacuum.

[Al]=1.44 mmol/g

To 1.485 ml of a toluene solution (11.1 wt %) of Ionic activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.34 mmol/g
[Ti]=31 μmol/g

EXAMPLE 6

Preparation of Modified Silicas

To 20 g of silica Sylopol 948 was added the desired quantity of metal salt as water solutions to target 1% metal in weight on the support. The silica was then calcined under nitrogen at 250° C. for 5 h.

| Silica batch | Metal salt used (as aquous solution) |
|---|---|
| A | Iron sulfate |
| B | Copper sulfate |
| C | Iron acetate |
| D | Comparative - no silica treatment |

Catalyst Preparations

EXAMPLE 7

To a suspension of 5.737 g of silica A (as described above) in hexane (30 ml) was added 10 ml of TEA (solution in hexane, [Al]=1.027 mol/l). The mixture was allowed to react for 30 minutes then the liquid fraction was filtered and the remaining solid was washed with 3×20 ml of hexane and finally dried under vacuum.

[Al]=1.40 mmol/g
[Fe]=0.88 wt %

To 1.485 ml of a toluene solution (11.1 wt %) of Ionic Activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.35 mmol/g
[Ti]=31 μmol/g
[Fe]=0.15 mmol/g

EXAMPLE 8

To a suspension of 5.732 g of silica B (as described above) in hexane (30 ml) was added 10 ml of TEA (solution in hexane, [Al]=1.047 mol/l). The mixture was allowed to react for 30 minutes then the liquid fraction was filtered and the remaining solid was washed with 3×20 ml of hexane and finally dried under vacuum.

[Al]=1.41 mmol/g
[Cu]=0.95 wt %

To 1.485 ml of a toluene solution (11.1 wt %) of Ionic Activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.41 mmol/g
[Ti]=33 μmol/g
[Cu]=0.13 mmol/g

EXAMPLE 9

To a suspension of 5.665 g of silica C (as described above) in bexane (30 ml) was added 10 ml of TEA (solution in hexane, [Al]=1.050 mol/l). The mixture was allowed to react for 30 minutes then the liquid fraction was filtered and the remaining solid was washed with 3×20 ml of hexane and finally dried under vacuum.

[Al]=1.35 mmol/g
[Fe]=0.83 wt %

To 1.485 ml of a toluene solution (11.1 wt %) of Ionic Activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.35 mmol/g
[Ti]=29 µmol/g
[Fe]=0.145 mmol/g

EXAMPLE 10 (COMPARATIVE)

To a suspension of 10 g of silica D (as described above) in hexane (50 ml) was added 7.4 ml of TEA (solution in hexane, [Al]=1.027 mol/l) and 8.4 ml of TiBAl (solution in hexane, 0.952 mol/l). The mixture was allowed to react for 30 minutes then the liquid fraction was filtered and the remaining solid was washed with 3×20 ml of hexane and finally dried under vacuum.

[Al]=1.35 mmol/g

To 1.485 ml of a toluene solution (11.1 wt %) of Ionic Activator A was added 0.252 ml of a toluene solution of TEA ([Al]=0.25 mol/l). This solution was the added to 4 g of the above prepared silica/(TEA+TiBAl) and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.28 mmol/g
[Ti]=31 µmol/g

Polymerisation Data

Gas Phase Polymerizations

The following gas phase examples for the copolymerisation of ethylene and 1-hexene were carried using the above supported catalyst compositions. The gas phase procedure was as follows:

A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving. Typical conditions are as follows:

Temperature: 70° C.
Ethylene pressure: 6.5 b

| Run | Catalyst | Ethylene (bar) | 1-Hexene (ppm) | Hydrogen (ml) | Catalyst (g) | Time (hrs) |
|---|---|---|---|---|---|---|
| 1 | Example 2 | 6.5 | 5000 | 40 (+10 ml at yield 455 g/g) | 0.101 | 1 |
| 2 | Example 3 | 6.5 | 6100 | 40 (+10 ml at yield 400 g/g) | 0.1 | 1 |

-continued

| Run | Catalyst | Ethylene (bar) | 1-Hexene (ppm) | Hydrogen (ml) | Catalyst (g) | Time (hrs) |
|---|---|---|---|---|---|---|
| 3 | Example 4 | 6.5 | 5900 | 40 (+10 ml at yield 520 g/g) | 0.107 | 1 |
| 4 | Example 5 (Comparative) | 6.5 | 6300 | 40 | 0.100 | 1 |
| 5 | Example 7 | 6.5 | 6200 | 50 (+10 at yield 500 g/g) | 0.102 | 1.1 |
| 6 | Example 8 | 6.5 | 6900 | 50 | 0.104 | 1 |
| 7 | Example 9 | 6.5 | 7600 | 50 (+10 at yield 550 g/g) | 0.101 | 1 |
| 8 | Example 10 (Comparative) | 6.5 | 6500 | 50 | 0.098 | 1.1 |

NB. In all gas phase examples the agitation speed was 100 rev/min.

The activities and the product characteristics are shown below-n

| Run | Activity (g/g · hr/bar) | Melt Index (2.16 kg) g/10 min | Density (g/ml) | PE statics (visual test) |
|---|---|---|---|---|
| 1 | 95 | 0.801 | 0.9185 | low |
| 2 | 100 | 0.75 | 0.920 | low |
| 3 | 101 | 1.254 | 0.9215 | low |
| 4 | 88 | 1.72 | 0.9205 | high |

| Run | Activity (g/mmol · h · bar) | Melt Index (2.16 kg) | Density (g · ml) | Electrostatic charge (KV/inch) |
|---|---|---|---|---|
| 5 | 2720 | 1.8 | 0.926 | −0.5 |
| 6 | 2130 | 0.74 | 0.917 | −0.4 |
| 7 | 3003 | 0.74 | 0.922 | −0.85 |
| 8 | 2520 | 1 | 0.927 | −2 |

Electrostatic charges was measured under same conditions using a Valitec Electrostatic sensor on the polyethylene powder when downloaded from the reactor.

It is clear from the above examples that all the catalysts prepared based on the treated silica supports show improved activities and lower PE statics than the comparative examples.

EXAMPLE 11

30 g of ES70 silica was impregnated in a round bottomed flask with an aqueous solution of iron (ii) D-gluconate dihydrate (2.6 g in 15 ml water). The resultant mixture was agitated for 30 minutes then introduced into a nitrogen fluidised silica calciner. Under a constant nitrogen flow the mixture was heated to 700° C., where upon the temperature was maintained for 5 hours prior to cooling to ambient temperature. A free flowing solid was recovered and used without further modification.

20 g of the silica was added to a glass reactor containing about 120 mls hexane and equipped with a stirrer. The slurry was stirred at 250 rpm and heated to 50° C. Dibutyl magnesium (DBM) was then added at an amount of 1 mmol per g. silica and the mixture stirred for 1 hour. Tetraethyl orthosilicate (TEOS) at an amount 0.44 mmol per g. silica was then added and the mixture stirred for 2 hours. Titanium tetrachloride ($TiCl_4$) was then added at an amount of 1 mmol per g.

EXAMPLE 12

Polymerisation

A stirred gas phase autoclave (2.5 L) was used for polymerisation using the catalyst prepared in example 11 in the presence of triethylaluminium as cocatalyst. A seed bed was added to the reactor prior to composition of the gas phase and heating to the reaction temperature. Following injection of the catalyst the ethylene pressure was maintained for 60 minutes prior to emptying the reactor. 0.2008 g catalyst was used for the polymerisation.

Polymerisation Conditions

| | |
|---|---|
| Ethylene | 6 bar |
| Hydrogen | 2.5 bar |
| Triethylaluminium | 0.7 mmol as 1M hexane solution |
| Temperature | 95° C. |
| Yield | 68.1 g polyethylene |

The invention claimed is:

1. A supported catalyst system suitable for the polymerisation of olefins comprising
   (a) a metallocene represented by the general formula:

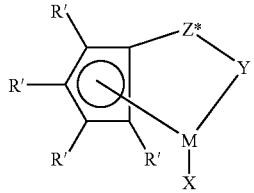

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
   (b) an activator
represented by the formula:

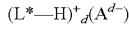

wherein
L* is a neutral Lewis base
$(L^*—H)^+_d$ is a Bronsted acid
$A^{d-}$ is a non-coordinating compatible anion of a Group IIIA (CAS Version) metal or metalloid having a charge of $d^-$, and
d is an integer from 1 to 3, and
   (c) a support material comprising an inorganic metal oxide, inorganic metal halide or polymeric material or mixtures thereof,
wherein the support material has been pretreated with a source of a transition metal atom before the support material is contacted with (a) and with (b).

2. A supported catalyst system according to claim 1 wherein the support material is silica.

3. A supported catalyst system according to claim 1 wherein the activator comprises a cation and an anion wherein the anion has at least one substituent comprising a moiety having an active hydrogen.

4. A supported catalyst system for the polymerisation of olefins comprising
   (a) a metallocene represented by the general formula:

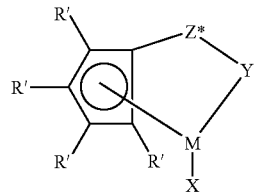

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
   (b) a cocatalyst comprising an organometallic compound, and
   (c) a support material comprising an inorganic metal oxide, inorganic metal halide or polymeric material or mixtures thereof,
wherein the support material has been pretreated with a transition metal salt selected from the group consisting of ferrous sulphate, cupric sulphate and ferrous D-gluconate before the support material is contacted with (a) and with (b).

5. A supported catalyst system according to claim 1 wherein the source of the transition metal atom is a transition metal salt.

6. A supported catalyst system according to claim 5 wherein the transition metal atom is iron or copper.

7. A supported catalyst system according to claim 5 wherein the transition metal salt is ferrous sulphate, cupric sulphate or ferrous D-gluconate.

8. A supported catalyst system according to claim 1 or 4 wherein the transition metal content on the support material is in the range 0.001% to 10%.

9. A process for the polymerisation of olefin monomers selected from the group consisting of (a) ethylene, (b) propylene, (c) mixtures of ethylene and propylene and (d) mixtures of (a), (b) or (c) with one or more other alpha-olefins, comprising performing said polymerisation process under polymerisation conditions in the presence of a supported catalyst system according to claim 1 or 4.

10. A process for the polymerisation of ethylene or the copolymerisation of ethylene and alpha-olefins having from 3 to 10 carbon atoms, comprising performing said polymerisation process under polymerisation conditions in the presence of a supported catalyst system according to claim 1 or 4.

11. A process according to claim 9 wherein the alpha-olefins are selected from the group consisting of 1-butene, 1-hexene, 4-methyl-1-pentene and 1-octene.

12. A process according to claim 9 carried out in the gas phase.

13. A process according to claim 10 wherein the alpha-olefins are selected from the group consisting of 1-butene, 1-hexene, 4-methyl-1-pentene and 1-octene.

14. A process according to claim 10 carried out in the gas phase.

15. A supported catalyst system suitable for the polymerisation of olefins comprising
(a) a metallocene represented by the general formula:

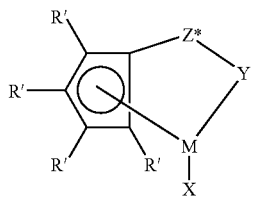

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
(b) an activator comprising a fluorine containing Group IIIA metal or metalloid compound, and
(c) a support material comprising an inorganic metal oxide, inorganic metal halide or polymeric material or mixtures thereof,
wherein the support material has been pretreated with a source of a transition metal atom before the support material is contacted with (a) and with (b).

16. A supported catalyst system according to claim 15 wherein the support material is silica.

17. A supported catalyst system according to claim 15 wherein the source of the transition metal atom is a transition metal salt.

18. A supported catalyst system according to claim 17 wherein the transition metal atom is iron or copper.

19. A supported catalyst system according to claim 17 wherein the transition metal salt is ferrous sulphate, cupric sulphate or ferrous D-gluconate.

20. A supported catalyst system according to claim 15 wherein the transition metal content on the support material is in the range 0.001% to 10%.

21. A process for the polymerisation of olefin monomers selected from the group consisting of (a) ethylene, (b) propylene, (c) mixtures of ethylene and propylene and (d) mixtures of (a), (b) or (c) with one or more other alpha-olefins, comprising performing said polymerisation process under polymerisation conditions in the presence of a supported catalyst system according to claim 15.

22. A process for the polymerisation of ethylene or the copolymerisation of ethylene and alpha-olefins having from 3 to 10 carbon atoms, comprising performing said polymerisation process under polymerisation conditions in the presence of a supported catalyst system according to claim 15.

23. A process according to claim 21 or 22 wherein the alpha-olefins are selected from the group consisting of 1-butene, 1-hexene, 4-methyl-1-pentene and 1-octene.

24. A process according to claim 21 or 22 carried out in the gas phase.

25. A supported catalyst system suitable for the polymerisation of olefins comprising
(a) a metallocene represented by the general formula:

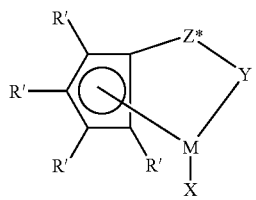

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, (b) an activator comprising a boron compound, and (c) a support material comprising an inorganic metal oxide, inorganic metal halide or polymeric material or mixtures thereof, wherein the support material has been pretreated with a source of a transition metal atom before the support material is contacted with (a) and with (b).

26. A supported catalyst system according to claim 25 wherein the support material is silica.

27. A supported catalyst system according to claim 26 wherein the source of the transition metal atom is a transition metal salt.

28. A supported catalyst system according to claim 27 wherein the transition metal atom is iron or copper.

29. A supported catalyst system according to claim 27 wherein the transition metal salt is ferrous sulphate, cupric sulphate or ferrous D-gluconate.

30. A supported catalyst system according to claim 26 wherein the transition metal content on the support material is in the range 0.001% to 10%.

31. A process for the polymerisation of olefin monomers selected from the group consisting of (a) ethylene, (b) propylene, (c) mixtures of ethylene and propylene and (d) mixtures of (a), (b) or (c) with one or more other alpha-olefins, comprising performing said polymerisation process under polymerisation conditions in the presence of a supported catalyst system according to claim 26.

32. A process for the polymerisation of ethylene or the copolymerisation of ethylene and alpha-olefins having from 3 to 10 carbon atoms, comprising performing said polymerisation process under polymerisation conditions in the presence of a supported catalyst system according to claim 26.

33. A process according to claim 31 or 32 wherein the alpha-olefins are selected from the group consisting of 1-butene, 1-hexene, 4-methyl-1-pentene and 1-octene.

34. A process according to claim 31 or 32 carried out in the gas phase.

* * * * *